US009332693B1

(12) United States Patent
Kile

(10) Patent No.: US 9,332,693 B1
(45) Date of Patent: *May 10, 2016

(54) AGRICULTURAL COMBINE HARVESTER WITH HARVESTING AND WINNOWING OPTIMIZATION CONTROL SYSTEM

(71) Applicant: Ronald J. Kile, Rosalia, WA (US)

(72) Inventor: Ronald J. Kile, Rosalia, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/933,601

(22) Filed: Nov. 5, 2015

Related U.S. Application Data

(62) Division of application No. 14/607,899, filed on Jan. 28, 2015, now Pat. No. 9,210,844, which is a division of application No. 13/747,807, filed on Jan. 23, 2013, now Pat. No. 8,968,064.

(51) Int. Cl.
A01D 41/127 (2006.01)
A01F 12/58 (2006.01)
A01F 7/02 (2006.01)
A01F 12/44 (2006.01)

(52) U.S. Cl.
CPC .............. A01F 12/58 (2013.01); A01D 41/127 (2013.01); A01F 7/02 (2013.01); A01F 12/444 (2013.01)

(58) Field of Classification Search
CPC combination set(s) only.
See application file for complete search history.

(56) References Cited

U.S. PATENT DOCUMENTS

| 3,589,109 | A | 6/1971 | Payne |
| 3,804,231 | A | 4/1974 | Maiste |
| 4,130,980 | A | 12/1978 | Fardal et al. |
| 4,142,348 | A | 3/1979 | Jordan et al. |
| 4,376,298 | A | 3/1983 | Sokol et al. |
| 4,893,241 | A | 1/1990 | Girodat et al. |
| 4,934,985 | A | 6/1990 | Strubbe |
| 6,036,597 | A | 3/2000 | Arner |
| 6,116,005 | A | 9/2000 | Chamberlain |
| 6,475,081 | B2 | 11/2002 | Coers et al. |
| 6,591,591 | B2 | 7/2003 | Coers et al. |
| 6,726,559 | B2 | 4/2004 | Bischoff |
| 6,865,870 | B2 | 3/2005 | Heisey |
| 7,921,626 | B2 | 4/2011 | Maertens et al. |
| 8,008,800 | B2 | 8/2011 | Mackin et al. |
| 8,061,112 | B2 | 11/2011 | Hugenroth |
| 2011/0238269 | A1 | 9/2011 | Martin et al. |

Primary Examiner — Alicia Torres
(74) Attorney, Agent, or Firm — Michael W. Goltry; Robert A. Parsons; Parsons & Goltry

(57) ABSTRACT

An agricultural combine has a threshing assembly for threshing a crop to produce chaff and grain, a cleaning assembly for removing the chaff from the grain, and a control system. The threshing assembly and the cleaning assembly operate at threshing and cleaning settings, respectively, for tending to produce a balance between a threshing load applied across the threshing assembly and a cleaning load applied across the cleaning assembly that tends to have a favorable influence on grain loss. The control system is for sensing an imbalance between the threshing load and the cleaning load tending to have an unfavorable influence on grain loss, and for concurrently adjusting the threshing and cleaning settings of the threshing and cleaning assemblies, respectively, for tending to convert the imbalance between the threshing and cleaning loads to a balance between the threshing and cleaning loads tending to have a favorable influence on grain loss.

5 Claims, 3 Drawing Sheets

AGRICULTURAL COMBINE HARVESTER WITH HARVESTING AND WINNOWING OPTIMIZATION CONTROL SYSTEM

FIELD OF THE INVENTION

The present invention relates to agricultural combines and, more particularly, agricultural combine control systems designed to improve combine efficiency.

BACKGROUND OF THE INVENTION

Agriculture is a major industry in the U.S., which is a net exporter of food. As of 2010 there were approximately 2.2 million farms in the U.S. covering an area of approximately 920 million acres. In 1800 approximately ninety percent of the entire U.S. population was employed in agriculture, and present day numbers have dropped to approximately two percent due largely to the development and implementation of large, automated agricultural equipment, such as combine harvesters, which have replaced large numbers of farm workers.

The crops grown in the U.S., such as wheat, barley, and rye, are only partly edible. While the seeds or grains at the top of each plant are edible and useful for making products such as bread and cereal, the rest of the plant, which is the chaff, is inedible and has to be discarded. Before modern-day machines were developed, such as in the 1800's, agricultural workers had to harvest crops by carrying out a series of laborious operations one after another. First they had to cut down the plants with a long-handled cutting tool such as a scythe. Next, they had to separate the edible grain from the inedible chaff by beating the cut stalks in an operation known as threshing. Finally, they had to clean any remaining debris away from the seeds to make them suitable for use in a mill. All this took a considerable amount of time and labor requiring large numbers of farm workers. The modern combine harvester carries out these various operations automatically eliminating the need for numerous farm workers.

Agricultural combines harvest an agricultural crop, thresh the harvested crop to break the large crop components from the smaller crop components, separate the smaller crop components from the larger crop components, and clean the smaller components to eliminate chaff from the grain. In operation, a combine harvester is driven through a field of a growing crop, whereby the combine harvester harvests, threshes, and winnows or separates the grain from the chaff. The grain collects in a tank inside the combine harvester, which is periodically emptied into tractors that drive alongside, and the chaff is ejected onto the field from an ejection spout at the back of the combine harvester. The combine may be equipped with various harvesting assemblies including grain platforms (rigid and flexible), corn headers, row crop headers or windrow pickup platforms depending on the crop and the harvesting practices employed by the farmer. The threshing assembly of the combine may be configured in a number of different ways, including a conventional transverse threshing cylinder and concave, or a rotary threshing system that is either axially of transversely arranged. In addition, the separating assembly may comprise conventional straw walkers or rotary assemblies.

In general, a combine harvester includes a header, a pickup reel, a cutter, a threshing assembly including a threshing drum and concave, a separating assembly, a cleaning assembly, a collection tank, and conveyors, such as rotating belts and spinning augers. The header gathers the crop, and the pickup reel pushes the crop down toward the cutter, which cuts the crop at the base near ground level. A conveyor picks up the cuttings from the cutter, and conveys the cuttings to the threshing drum, which rotates and threshes the cuttings against the concave separating the grains from the chaff to form threshings, namely, the chaff and the separated grains. The threshings are then applied to the cleaning assembly from the separating assembly.

The cleaning assembly removes chaff from the grain. The cleaning assembly typically includes a cleaning shoe and a cleaning fan. The smaller crop components from the threshing assembly and the separating assembly are directed to the cleaning shoe. The cleaning shoe typically is provided with a chaffer and a sieve. The chaffer and sieve have transverse louvers that define openings. The heavier clean grain falls through the openings formed by the louvers on the chaffer and the sieve. The air blast from the cleaning fan blows the chaff out the rear of the combine.

There are three types of cleaning shoe actions, namely, reciprocating, shaker and cascading. In a reciprocating shoe the chaffer and sieve move in opposite directions to one another. In a shaker shoe the chaffer and sieve move in the same direction at the same time. In a cascading shoe the chaffers and sieve are positioned so that the small components drop from one unit to another in a cascading or rolling motion.

The operational efficiency of a combine harvester is proportional to variations in loading across the threshing, separating, and cleaning assemblies caused principally by variations in crop feedrate caused by variations in combine ground speed and crop condition. In about the 1980s, on-board electronics were introduced to measure threshing efficiency. This new instrumentation allowed operators to get better grain yields by optimizing ground speed and other parameters via the operator controls in the cab of the combine. This required the farmer to constantly monitor the threshing efficiency measurements and make period adjustments to ground speed and other parameters, which proved cumbersome and tiresome and largely impracticable. Recent developments have attempted to solve this problem with ground speed controls that automatically adjust combine ground speed in response to through-put measurements. Although the implementation of such speed control units has been shown to improve grain yield, speed adjustments increase fuel consumption and strain engine components and drive trains.

SUMMARY OF THE INVENTION

According to the principle of the invention, an agricultural combine includes a frame, ground engaging machinery for propelling the frame through a field, a threshing assembly for threshing a harvested agricultural crop to produce chaff and grain, a cleaning assembly for removing the chaff from the grain, and a control assembly. The threshing assembly and the cleaning assembly operate at first and second settings, respectively, for tending to produce a balance between a threshing load applied across the threshing assembly and a cleaning load applied across the cleaning assembly that tends to have a favorable influence on grain loss. The control system is operatively coupled to the threshing assembly and the cleaning assembly for sensing an imbalance between the threshing load and the cleaning load tending to have an unfavorable influence on grain loss, and for concurrently adjusting the first and second settings of the threshing assembly and the cleaning assembly, respectively, for tending to convert the imbalance between the threshing load and the cleaning load to a balance between the threshing load and the cleaning load tending to have a favorable influence on grain loss.

According to the principle of the invention, an agricultural combine includes a frame, ground engaging machinery for propelling the frame through a field, a threshing assembly for threshing a harvested agricultural crop to produce chaff and grain, a cleaning assembly for removing the chaff from the grain, and a control system. The threshing assembly includes a threshing drum that operates at a standard threshing drum drive torque, a concave that operates at a set distance from the threshing drum in relation to the standard threshing drum drive torque, and a concave drive unit. The cleaning assembly includes a blower that operates at a set blow rate in relation to the standard threshing drum drive torque, a blower drive unit, a chaffer that operates at a set inclination in relation to the standard threshing drum drive torque, and a chaffer drive unit. The control system, operatively coupled to the threshing drum, the concave drive unit, the blower drive unit, and the chaffer drive unit, is for sensing a variation in the standard threshing drum drive torque and for activating the concave drive unit for making a variation in the set distance of the concave for tending to buffer the variation in the standard threshing drum drive torque, and for activating the blower drive unit and the chaffer drive unit for making variations in the set blow rate of the blower and the set inclination of the chaffer, respectively, for tending to match the variation in the standard threshing drum drive torque, so as to tend to favorably influence grain loss. The control system includes a torque sensor for measuring variations in the standard threshing drum drive torque, and a control unit operatively coupled between, on the one hand, the torque sensor, and, on the other hand, each of the concave, blower, and chaffer drive units. The variation in the set distance of the concave is one of increasing and decreasing the distance of the concave from the set distance of the concave. The variation in the set blow rate of the blower is one of increasing and decreasing the blow rate of the blower. The variation in the set inclination of the chaffer is one of increasing and decreasing the inclination of the chaffer relative to the blower.

According to the principle of the invention, an agricultural combine includes a frame, ground engaging machinery for propelling the frame through a field, a threshing assembly for threshing a harvested agricultural crop to produce chaff and grain, a cleaning assembly for removing the chaff from the grain, and a control system. The threshing assembly includes a threshing drum that operates at a standard threshing drum drive torque, a concave that operates at a set distance from the threshing drum in relation to the standard threshing drum drive torque, and a concave drive unit. The cleaning assembly includes a blower that operates at a set blow rate in relation to the standard threshing drum drive torque, a blower drive unit, a chaffer that operates at a set chaffer inclination in relation to the standard threshing drum drive torque, a chaffer drive unit, a sieve that operates at a set sieve inclination in relation to the standard threshing drum drive torque, and a sieve drive unit. The control system, operatively coupled to the threshing drum, the concave drive unit, the blower drive unit, the chaffer drive unit, and the sieve drive unit, is for sensing a variation in the standard threshing drum drive torque and for activating the concave drive unit for making a variation in the set distance of the concave for tending to buffer the variation in the standard threshing drum drive torque, and for activating the blower drive unit and the chaffer drive unit and the sieve drive unit for making variations in the set blow rate of the blower and the set chaffer and sieve inclinations of the chaffer and the sieve, respectively, for tending to match the variation in the standard threshing drum drive torque, so as to tend to favorably influence grain loss. The control system includes a torque sensor for measuring variations in the standard threshing drum drive torque, and a control unit operatively coupled between, on the one hand, the torque sensor, and, on the other hand, each of the concave, blower, chaffer, and sieve drive units. The variation in the set distance of the concave is one of increasing and decreasing the distance of the concave from the set distance of the concave. The variation in the set blow rate of the blower is one of increasing and decreasing the blow rate of the blower. The variation in the set inclination of the chaffer is one of increasing and decreasing the inclination of the chaffer relative to the blower. The variation in the set inclination of the sieve is one of increasing and decreasing the inclination of the sieve relative to the blower.

BRIEF DESCRIPTION OF THE DRAWINGS

Referring to the drawings.

DETAILED DESCRIPTION

In general, an agricultural combine includes a frame, ground engaging machinery for propelling the frame through a field, a threshing assembly for threshing a harvested agricultural crop to produce chaff and grain, a cleaning assembly for removing the chaff from the grain, and a control assembly. The threshing assembly and the cleaning assembly operate at first and second settings, respectively, for tending to produce a balance between a threshing load applied across the threshing assembly and a cleaning load applied across the cleaning assembly that tends to have a favorable influence on grain loss. The control system is operatively coupled to the threshing assembly and the cleaning assembly for sensing an imbalance between the threshing load and the cleaning load tending to have an unfavorable influence on grain loss, and for concurrently adjusting the first and second settings of the threshing assembly and the cleaning assembly, respectively, for tending to convert the imbalance between the threshing load and the cleaning load to a balance between the threshing load and the cleaning load tending to have a favorable influence on grain loss.

Figure 1:
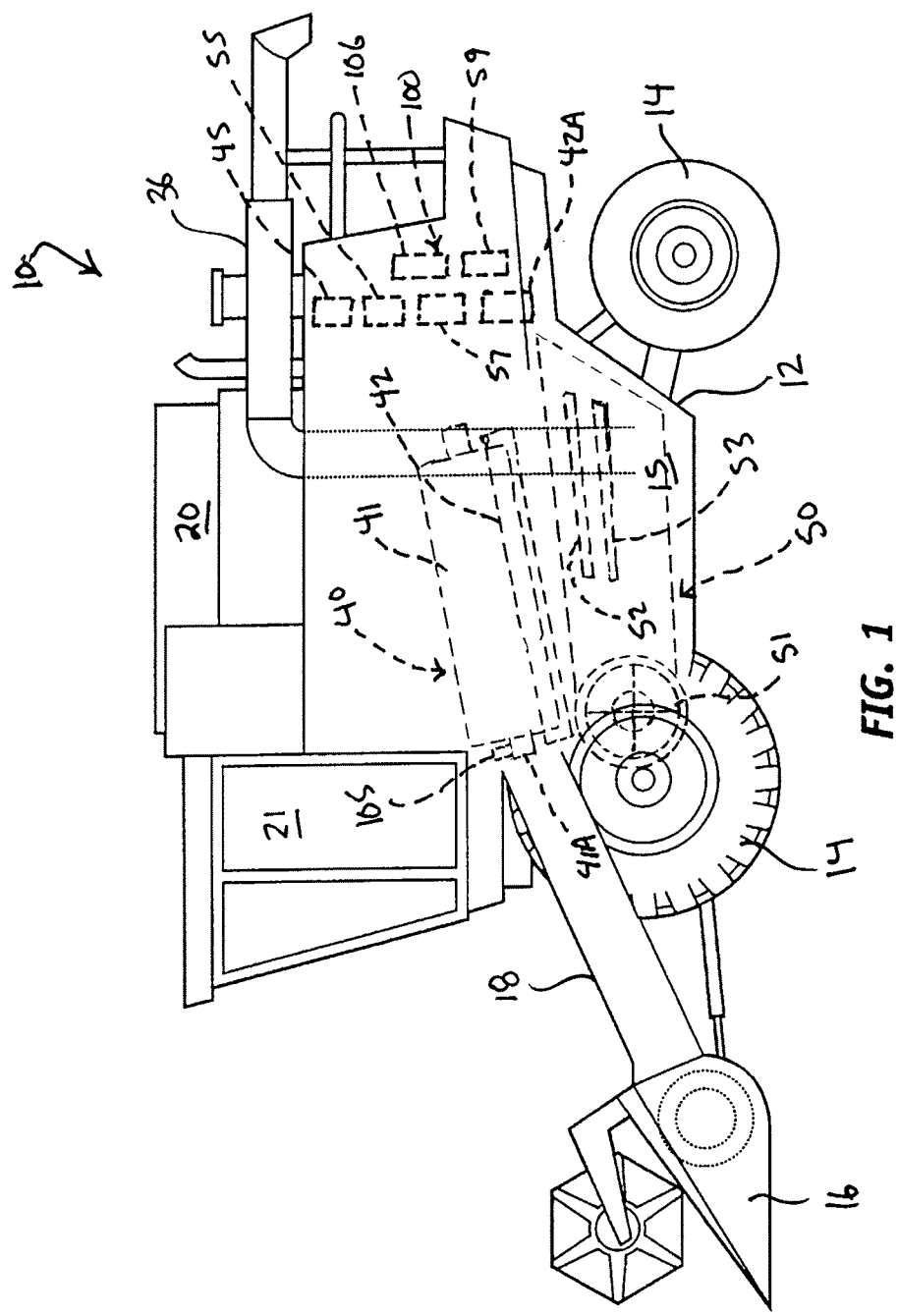
FIG. 1 is a side view of an agricultural combine including the present invention.

Turning now to the drawings, in which like reference characters indicate corresponding elements throughout the several views, attention is directed to FIG. 1, which is the side view of a self-propelled agricultural combine 10 for harvesting grain crops, such as wheat, oats, rye, barley, corn, soybeans, and garbanzo beans. Combine 10 includes a frame 12 that is provided with ground engaging machinery, such as tracks or wheels 14 as shown here, for supporting and propelling the combine 10. Frame 12 has two axially extending sidesheets 15 between which are located the various crop processing assemblies of combine 10, including threshing assembly 40 and cleaning assembly or shoe 50. Extending forwardly from the combine 10 is a harvesting platform 16 which directs a harvested crop to a feederhouse 18, which is a conveyor for directing the harvested crop material to threshing assembly 40 and cleaning assembly 50 located within sidesheets 15 of the combine 10.

Feederhouse 18 directs the harvested crop to a transverse beater (not shown) which propels the crop material through an inlet transition section (not shown) to threshing assembly 40, which in combine 10 is an axial threshing assembly consisting of axially arranged threshing drum 41 and concave 42.

Grain and chaff are directed from threshing assembly 40 to cleaning assembly 50, which winnows or separates the chaff from the grain and directs the clean grain to a grain tank 20 and the chaff is blown out the rear of the combine from cleaning assembly 50. Clean grain temporarily stored in grain tank 20 can be unloaded by an operator in operator's cab 21 actuating unloading auger 36.

Threshing assembly 40 produces a high grain/low chaff mixture. This grain-rich mixture is directed to axial augers, which direct this grain-rich mixture to cleaning assembly 50 for winnowing in preparation for application to grain tank 20. Cleaning assembly 50 includes cleaning fan or blower 51, chaffer 52, and sieve 53. A sustained air stream/blast from blower 51 blows the chaff and the grain rearwardly to chaffer 52, where the lighter chaff is blow away and separated from the heavier grains at chaffer 52 and is blown out the rear of combine 10 by the sustained air stream from blower 51. The heavier grains separated from the lighter chaff at chaffer 52 fall into the bottom of cleaning assembly 50 through sieve 53, which directs the clean grain to grain tank 20 via augers.

Concave 42 is under threshing drum 41 and is located at a height relative to threshing drum 41, or otherwise a distance from threshing drum 41, so as to be separated from threshing drum 41 by a threshing distance that forms a threshing area between concave 42 and drum 41 where crop material is applied and threshed. The threshing distance of the threshing area is chosen and set based on the crop to be harvested and the set ground speed of the combine through the field. The threshing distance varies from crop-to-crop regardless of combine ground speed, and is a lesser distance (e.g. less than 1 inch) for small grain crops, such as wheat, oats, rye, and barley, and is a greater distance (e.g., greater than one inch) for comparatively larger grain crops, such as corn, soybeans, and garbanzo beans. Combine 10 has a conventional concave drive unit, denoted generally at 45, which is a machine part that is operated to adjust the height of concave 42 relative to threshing drum for increasing and decreasing the threshing distance of the threshing area between concave 42 and threshing drum 41, and to set threshing drum 41 at chosen height so as to define a chosen threshing distance of the threshing area for the crop to be harvested. The height of concave 42 relative to threshing drum 41 can be adjusted and set, so as to increase and decrease and set the threshing distance of the threshing area, by an operator in operator's cab 21 actuating concave drive unit 45 via in-cab controls.

Blower 51 is upstream of chaffer 52 and sieve 53. Blower 51 operates at a blow rate. The blow rate of blower 51 is determined by blower 51 revolutions-per-minute (RPMs). The blow rate of blower 51 produces a set air blast/stream to blow the chaff and the grain to chaffer 52. The blow rate is set to the crop to be harvested. The blow rate varies from crop-to-crop, as is known in the art, and is a lesser blow rate for small grain crops, such as wheat, oats, rye, and barley, and is a greater blow rate for comparatively larger and heavier grain crops, such as corn, soybeans, and garbanzo beans, as is known in the art. Combine 10 has a conventional blower drive unit, denoted generally at 55, which is a machine part that is operated to adjust the blow rate of blower 51, via increasing and decreasing blower 51 RPMs, for increasing and decreasing the blow rate of blower 51, and to set blower 51 at chosen blow rate for the crop to be harvested. The blow rate of blower 51 can be adjusted and set by an operator in operator's cab 21 actuating blower drive unit 55 via in-cab controls.

Chaffer 52 is downstream of blower 51 and is above sieve 53 of the illustrated combine 10. Chaffer 52 operates at an inclination relative to blower 51 from level to 16 degrees. The greater the inclination is of chaffer 52 the greater the cleaning action is at chaffer 52, such as at increased volumes of crop material throughput and at increased blower 51 blow rates, such as between 1000-1200 RPMs. The lesser the inclination is of chaffer 52 the lesser the cleaning action is at chaffer 52, such as at decreased volumes of crop material throughput and at decreased blower 51 blow rates, such as between 800-1000 RPMs. The inclination of chaffer 52 may be referred to as chaffer inclination.

Sieve 53 is downstream of blower 51 and is conventionally below or under chaffer 52 of the illustrated combine 10 as is known in the art. Sieve 53 operates at an inclination relative to blower 51 from level to 16 degrees. The greater the inclination is of sieve 53 the greater the cleaning action is at sieve 53, such as at increased volumes of crop material throughput and at increased blower 51 blow rates, such as between 1000-1200 RPMs. The lesser the inclination is of sieve 53 the lesser the cleaning action is at sieve 53, such as at decreased volumes of crop material throughput and at decreased blower 51 blow rates, such as between 800-1000 RPMs. The inclination of sieve 53 may be referred to as sieve inclination.

The blow rate of blower 51 is matched to the inclination of chaffer 52, e.g., the greater the inclination of chaffer 52 the greater the blow rate of blower 51, and the lesser the inclination of chaffer 52 the lesser the blow rate of blower 51. Matching the inclination of chaffer 52 with the blow rate of blower 51 has a favorable influence on grain loss and a favorable influence on the separation of chaff from the grain at chaffer 52. It is known in the art that the inclination of chaffer 52 is chosen based on the crop to be harvested and the chosen blower 51 blow rate. Because the blow rate of blower 51 varies from crop-to-crop, and is lesser/decreased for small grain crops, such as wheat, oats, rye, and barley, and is greater/increased for comparatively larger and heavier grain crops, such as corn, soybeans, and garbanzo beans, as is known in the art, the inclination of chaffer 52 varies from crop-to-crop to match the blow rate of blower 51. Because the blow rate of blower 51 is lesser/decreased for small grain crops and is greater/increased for large grain crops, the inclination of chaffer 52 is lesser/decreased for small grain crops and is greater/increased for large grain crops. Combine 10 has a conventional chaffer drive unit, denoted generally at 57, which is a machine part that is operated to adjust the inclination of chaffer 52, and to set the inclination of chaffer 52. The inclination of chaffer 52 can be adjusted and set by an operator in operator's cab 21 actuating chaffer drive unit 57 via in-cab controls.

The blow rate of blower 51 is also matched to the inclination of sieve 53, e.g., the greater the inclination of sieve 53 the greater the blow rate of blower 51, and the lesser the inclination of sieve 53 the lesser the blow rate of blower 51. Matching the inclination of sieve 53 with the blow rate of blower 51 has a favorable influence on grain loss and a favorable influence on the secondary/final separation of chaff from the grain at sieve 53. It is known in the art that the inclination of sieve 53 is chosen based on the crop to be harvested and the chosen blower 51 blow rate. Because the blow rate of blower 51 varies from crop-to-crop, and is lesser/decreased for small grain crops, such as wheat, oats, rye, and barley, and is greater/increased for comparatively larger and heavier grain crops, such as corn, soybeans, and garbanzo beans, as is known in the art, the inclination of sieve 53 varies from crop-to-crop to match the blow rate of blower 51. Because the blow rate of blower 51 is lesser/decreased for small grain crops and is greater/increased for large grain crops, the inclination of sieve 53 is lesser/decreased for small grain crops and is greater/increased for large grain crops. Combine 10 has a conventional sieve drive unit, denoted generally at 59, which is a machine part that is operated to adjust the inclination of sieve 53, and to set the inclination of sieve 53. The inclination of sieve 53 can be adjusted and set by an operator in operator's cab 21 actuating sieve drive unit 59 via in-cab controls.

A recommended or standard threshing drum drive torque or load for the illustrated combine 10 during harvesting operation, regardless of the harvested crop, is approximately 250 newton meters. This recommended or standard threshing drum drive torque that defines the load across threshing assembly 40 during threshing operation is a function of the normal or standard operating parameters or settings of threshing assembly 40 of the illustrated combine 10. The action on crop material between threshing drum 41 and concave 42 and the throughput volume of crop material translating at the threshing area between threshing drum 41 and concave 42 determines the load on threshing drum 41, or otherwise the load across threshing assembly 40, as measured by threshing drum drive torque. Concave 42 is set to a height or distance relative to threshing drum 41 and the crop to be threshed in order to produce the standard or recommended threshing drum drive torque during threshing operation, which produces a corresponding standard or recommended crop throughput from threshing assembly 40 to cleaning assembly 50. The blow rate of blower 51 and the inclination of chaffer 52 and the inclination of sieve 53, which together define the load across cleaning assembly 50 during cleaning operation, are, in turn, set to standard or recommended settings to match the load on threshing drum 41, i.e., the recommended or standard threshing drum drive torque of threshing drum 42, so as to match the throughput of grain-rich material, which has a favorable influence on grain loss. And so at the standard or recommended threshing drum drive torque, a standard throughput of grain-rich material is applied from threshing assembly 40 to axial augers and to cleaning assembly 50. Concave 42 operates at a set height in relation to the recommended or standard threshing drum drive torque so as to cause threshing drum 41 to assume the recommended or standard threshing drum drive torque during a harvesting operation so as to produce a standard throughput of grain-rich material to cleaning assembly 50, and blower 51 and chaffer 52 and sieve 53 operate at a set blow rate and set inclinations, respectfully, in relation to the standard threshing drum drive torque so as to match the recommended or standard threshing drum drive torque in order to cause cleaning assembly 50 to standardly winnow a standard throughput of the grain-rich material through cleaning assembly 50. These described settings of the set or standard threshing drum drive torque, blower 51 blow rate, and chaffer 52 and sieve 53 inclinations produce a match between the load applied across threshing assembly 40 and the load applied across cleaning assembly 50. A balance or match between the load applied across threshing assembly 40 and the load applied across cleaning assembly 50 has a favorable influence on grain loss. An imbalance or mis-match between the load applied across threshing assembly 40 and the load applied across cleaning assembly 50 has an unfavorable influence on grain loss. In recognition of this problem of imbalance or mis-match between the load applied across threshing assembly 40 and the load applied across cleaning assembly 50 that has an unfavorable influence on grain loss, the invention tends compensate for such an imbalance or mis-match so as to tend toward balance or matching between the load applied across threshing assembly 40 and the load applied across cleaning assembly 50 so as to have a favorable influence on grain loss.

It is known in the art that variations in the threshing drum drive torque due to varying crop feed-rate have an unfavorable influence on grain loss because variations in the threshing drum drive torque produces variations threshing efficiency and in the throughput of grain-rich material to the cleaning assembly either overwhelming the cleaning assembly with grain-rich material in increased variations in the threshing drum drive torque or depriving the cleaning assembly of grain-rich material in decreased variations in threshing drum drive torque. Grain loss increases as a function of the greater standard deviation of the threshing drum drive torque, and decreases as a function of the lesser standard deviation of the threshing drum drive torque. For a combine harvester, including the illustrated combine 10, one cannot determine a so-called static or standard characteristic for a standard deviation of the threshing drum drive torque because of the dynamic character of the crop feed-rate.

Nevertheless, it is known that the threshing drum drive torque increases with increased feed-rates to the threshing assembly, and decreases with decreased feed-rates to the threshing assembly. At increased feed-rates in the illustrated combine 10, the feed-rate of the grain-rich mixture from the threshing assembly 40 to axial augers and to cleaning to cleaning assembly 50 increases. Grain loss occurs if the blow rate of blower 51 and the inclination of chaffer 52 are not set to handle or match this increase and if the inclination of sieve 53 is also not set to handle or match this increase. At decreased feed-rates, the feed-rate of the grain-rich mixture from the threshing assembly 40 to axial augers and to cleaning to cleaning assembly 50 decreases. Grain loss occurs if the blow rate of blower 51 and the inclination of chaffer 52 are not set to handle or match this decrease and if the inclination of sieve 53 is additionally not set to handle or match this decrease. According to the present invention, a favorable influence on grain loss is obtained by adjusting the height of concave 42 to adjust the threshing distance of the threshing area to buffer variations in the standard threshing drum drive torque, and by adjusting the blow rate of blower 51 and inclination of chaffer 52 to match variations in the threshing drum drive torque all with combine harvesting and winnowing optimization control system 100 of the invention, and by also adjusting the inclination of sieve 53 to match variations in the threshing drum drive torque with the combine harvesting and winnowing optimization control system 100. In response to an imbalance or mis-match between the load applied across threshing assembly 40 and the load applied across cleaning assembly 50 caused by variations in the set or standard threshing drum drive torque that tends to produce an unfavorable influence on grain loss, control system 100 is responsive and tends to produce a balance or match between the load applied across threshing assembly 40 and the load applied across cleaning assembly 50 so as to tend to produce a favorable influence on grain loss.

Figure 2:
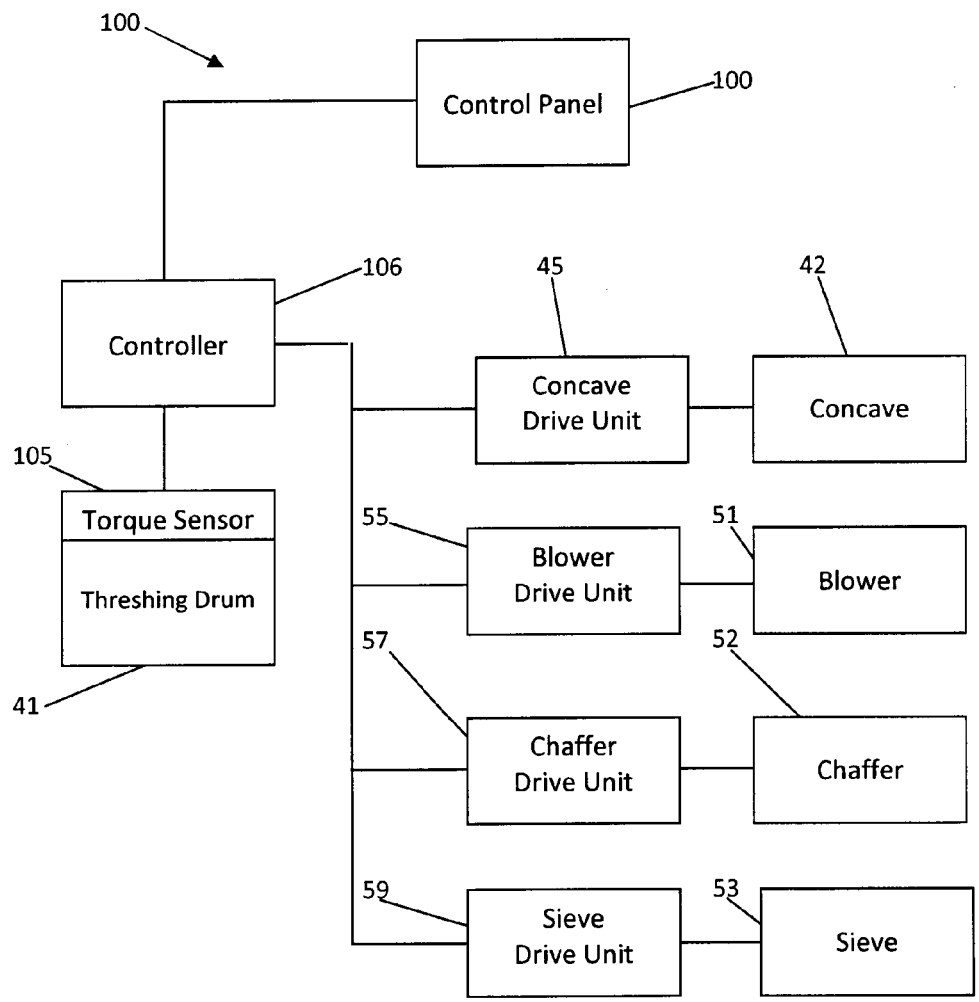
FIG. 2 is a highly generalized block diagram of the present invention.
Figure 3:
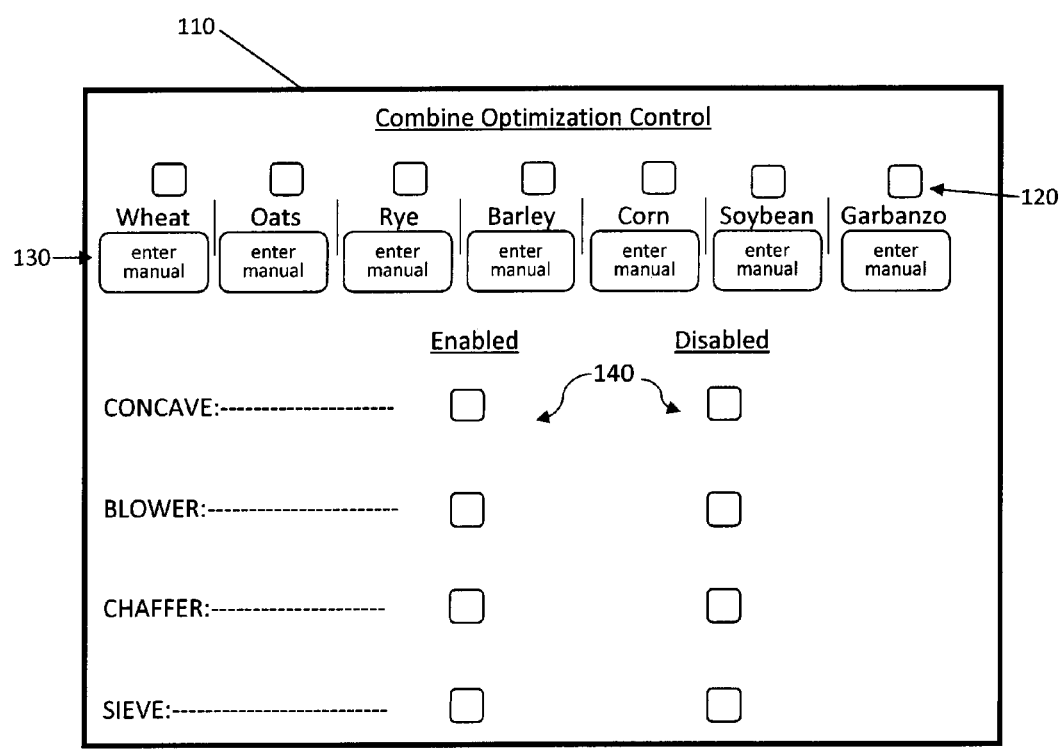
FIG. 3 is a highly generalized representation of a control panel of the present invention.

According to the principle of the invention in reference in relevant part to FIGS. 1 and 2, the illustrated combine 10 includes the aforementioned control system 100, the aforementioned threshing assembly 40 for threshing a harvested agricultural crop to produce chaff and grain, and the aforementioned cleaning assembly 50 for removing the chaff from the grain. Threshing assembly 40 and cleaning assembly 50 are set for operation at threshing and cleaning settings, respectively, for tending to produce a balance between a threshing load applied across threshing assembly 40 during threshing operation and a cleaning load applied across cleaning assembly 50 during cleaning operation that tends to have a favorable influence on grain loss. Control system 100, operatively coupled to threshing assembly 40 and cleaning assembly 50, is for sensing imbalance between the threshing load and the cleaning load tending to have an unfavorable influence on grain loss, and for adjusting, preferably concurrently, the threshing and cleaning settings of threshing assembly 40 and cleaning assembly 50, respectively, for tending to convert imbalance between the threshing load and the cleaning load to balance between the threshing load and the cleaning load tending to have a favorable influence on grain loss.

More specifically, threshing assembly 40 includes threshing drum 41 that operates at a set or standard threshing drum drive torque, concave 42 that operates at a set height so as to be at a set distance from the threshing drum in relation to or otherwise that matches the set or standard threshing drum drive torque so as, more particularly, to define a set threshing distance of the threshing area between concave 42 and threshing drum 41 that matches the set or standard threshing drum drive torque, and concave drive unit 45. Cleaning assembly 50 includes blower 51 that operates at a set blow rate in relation to or otherwise that matches the set or standard threshing drum drive torque, blower drive unit 55, chaffer 52 that operates at a set inclination in relation to or otherwise that matches the set or standard threshing drum drive torque, chaffer drive unit 57, sieve 53 that operates at a set inclination in relation to or otherwise that matches the set or standard threshing drum drive torque, and sieve drive unit 59. These settings tend to produce, or otherwise tend toward, a balance between the load applied across threshing assembly 40 and the load applied across cleaning assembly 50 so as to favorably influence grain loss. Control system 100, operatively coupled to threshing drum 41, concave drive unit 45, blower drive unit 55, chaffer drive unit 57, and sieve drive unit 59 is for sensing variation in the set or standard threshing drum drive torque and for activating concave drive unit 45 for making variation in the set distance of concave 42 for tending to buffer the variation in the set or standard threshing drum drive torque, and for activating blower drive unit 55 and chaffer drive unit 57 and sieve drive unit 59 for making variations in the set blow rate of blower 51 and the set inclinations of chaffer 52 and sieve 53, respectively, for tending to match the variation in the standard threshing drum drive torque, so as to tend to favorably influence grain loss. In a particular embodiment, adjustment of sieve 53 may be omitted from influence by control system 10, in which case control system 100 is for activating concave drive unit 45 for making variation in the set distance of concave 42 for tending to buffer the variation in the set or standard threshing drum drive torque, and for activating blower drive unit 55 and chaffer drive unit 57 for making variations in the set blow rate of blower 51 and the set inclination of chaffer 52, respectively, which still tends to match the variation in the standard threshing drum drive torque, so as to tend to favorably influence grain loss. The variation in the set distance of concave 42 relative to threshing drum 41 is one of increasing and decreasing the distance of concave 42 relative to threshing drum 41 from the set distance of concave 42 from threshing drum 41. The variation in the set blow rate of blower 51 is one of increasing and decreasing the blow rate of blower 51. The variation in the set inclination of chaffer 52 is one of increasing and decreasing the inclination of chaffer 52 relative to blower 51. The variation in the set inclination of sieve 53 is one of increasing and decreasing the inclination of sieve 53 relative to blower 51. This is described more fully below.

Control system 100 is operatively coupled to the threshing drum 42, concave drive unit 45, blower drive unit 55, chaffer drive unit 57, and sieve drive unit 59, and senses variations in the set or standard threshing drum drive torque that tend to produce an imbalance or mis-match between the load applied across threshing assembly 40 and the load applied across cleaning assembly 50 that, in turn, tend to unfavorably influence grain loss. In response to control system 100 sensing variations in the set or standard threshing drum drive torque, control system 100 makes adjustments in the threshing assembly 40 and cleaning assembly settings 50 so as to tend to produce, or otherwise tend toward, a balance or match between the load applied across threshing assembly 40 and the load applied across cleaning assembly 50 so as to tend to produce, or otherwise tend toward, a favorable influence on grain loss. Control system 100 activates concave drive unit 45 for making variations in the set distance of concave 42 that tends to buffer or match variations in the set or standard threshing drum drive torque, and activates blower drive unit 55 and chaffer drive unit 57 and sieve drive unit 59 for making variations in the set blow rate of blower 51 and the set inclination of chaffer 52 and the set inclination of sieve 53, respectively, in relation to variations in the standard threshing drum drive torque so as tend to match the blow rate of blower 51 and the inclination of chaffer 52 to the variations in the set or standard threshing drum drive torque so as to favorably influence grain loss. As indicated above, the variations in the set distance of concave 42 from threshing drum 41 include increasing and decreasing the distance of concave 42 from the set distance of concave 42 by decreasing and increasing the height of concave 42 relative to threshing drum 41, the variations in the set blow rate of blower 51 include increasing and decreasing the blow rate of blower 51, the variations in the set inclination of chaffer 52 include increasing and decreasing the inclination of chaffer 52 relative to blower 51, and variations in the set inclination of sieve 53 include increasing and decreasing the inclination of sieve 53 relative to blower 51. These variations made to concave 42, blower 51, and chaffer 52 produce settings of concave 42, blower 51, chaffer 52, and sieve 53 that tend to match the variations in the threshing drum drive torque, which favorably influences grain loss. The variations made to sieve 53 can be omitted, if desired, in which the variations made to concave 42, blower 51, and chaffer 52 produce settings of concave 42, blower 51, and chaffer 52 that tend to match the variations in the threshing drum drive torque, which favorably influences grain loss.

Control system 100 includes a torque sensor 105 for sensing and measuring threshing drum drive torque, and a control unit 106 operatively coupled between, on the one hand, torque sensor 105, and, on the other hand, each of the concave, blower, chaffer, and sieve drive units 45, 55, 57, and 59, respectively. Control unit 106 and torque sensor 105 are coupled in signal or operational communication via conventional electrical wiring, and torque sensor 105 is conventionally coupled to the drive shaft 41A of threshing drum 41 to sense and measure the threshing drum drive torque. Control unit 106 is coupled in signal or operational communication to concave, blower, chaffer, and sieve drive units 45, 55, 57, and 59 via conventional electrical wiring. Control unit 106 is a programmable logic controller that controls the operation of torque sensor 105, and concave drive unit 45, blower drive unit 55, chaffer drive unit 57, and sieve drive unit 59. Torque sensor 115 in the illustrated combine 10 is configured to measure threshing drum drive torque in newton meters, and control unit 106 is operatively coupled in signal communication via conventional wiring to continuously receive measured threshing drum drive torque values from torque sensor 105. Preferably, control unit 106 continually receives measured threshing drum drive torque values from torque sensor 105 at from 1 to 5 second intervals as a matter of example.

Control unit 106 is programmed with set or standard combine operation values, including a set or standard value of threshing drum drive torque, a set or standard or chosen height of concave 42 to define a set or standard or chosen threshing distance value between concave 42 and threshing drum 41, a set or standard or chosen blow rate of blower 51, a set or standard or chosen inclination of chaffer 52, and a set or standard or chosen inclination of chaffer 53. The height setting value of concave 42 is set to a height to produce a set or standard or chosen threshing distance value between concave 42 and threshing drum 41 and to produce the set or standard threshing drum drive torque to produce a set or standard crop throughput to cleaning assembly 50, and the values of the blow rate of blower 51 and the inclination of chaffer 52 and the inclination of sieve 53 are set or chosen so as to tend to match or balance the standard threshing drum drive torque in order to cause cleaning assembly 50 to standardly winnow a standard throughput of the grain-rich material through cleaning assembly 50. As torque sensor 105 senses the threshing drum drive torque and control unit 106 receives measured threshing drum drive torque values from torque sensor 105, control unit 106 compares via programming the measured threshing drum torque values to the set or standard threshing drum torque value, and in response to a variation in the set or standard threshing drum drive torque, namely, a variation between a measured threshing drum drive torque value from torque sensor 105 and the set or standard threshing drum drive torque value programmed into control unit 106, activates concave drive unit 45 for making a variation in the set height of concave 42 for making a variation in the set threshing distance between concave 42 and threshing drum 41 for tending to buffer the variation in the set or standard threshing drum drive torque, and activates blower drive unit 55 and chaffer drive unit 57 and sieve drive unit 59 for making a variation in the set blow rate of blower 51 and variations in the set inclinations of chaffer 52 and sieve 53, respectively, in relation to the variation in the set or standard threshing drum drive torque to tend to match the variation in the set or standard threshing drum drive torque so as to tend to favorably influence grain loss. This action is taken for each variation in the threshing drum drive torque. As explained above, control unit 106 activation of sieve drive unit 59 for varying the set inclination of sieve 53 can be omitted, if desired, while control unit 106 activation of concave, blower, and chaffer drive units 45, 55, and 57 still tending to favorably influence grain loss.

In a preferred embodiment, each variation in the threshing drum drive torque, whether an increase or a decrease, is five-percent of the set or standard threshing drum drive torque value. In the illustrated combine 10, the set or standard threshing drum drive torque value is 250 newton meters. Accordingly, for each variation of 12.5 newton meters in the measured threshing drum drive torque as measured by torque sensor 105, whether above or below the set or standard threshing drum drive torque value of 250 newton meters, control unit 106 is responsive and activates the concave drive unit 45 to make a variation in the height of concave 42, activates the blower drive unit 55 for making a variation in the blow rate of blower 51, activates the chaffer drive unit 57 for making a variation in the inclination of chaffer 52, and activates the sieve drive unit 59 for making a variation in the inclination of sieve 53. Preferably, each five-percent variation in the measured threshing drum drive torque produces a two-percent variation in the height of concave 42 to produce a two-percent variation in the threshing distance between concave 42 and threshing drum 41, a two-percent variation in the blow rate of blower 51, a two-percent variation in the inclination of chaffer 52, and a two-percent variation in the inclination of sieve 53. In response to a five-percent variation of the measured threshing drum drive torque above the set or standard threshing drum drive torque value, control unit 106 is responsive and activates the concave drive unit 45 to lower the height of concave 42 by two-percent of the set or standard or chosen threshing distance between concave 42 and threshing drum 41 so as to increase the threshing distance between concave 42 and threshing by two-percent of the set or standard or chosen threshing distance value, activates the blower drive unit 55 for making an increase in the blow rate of blower 51 by two-percent of the set or standard or chosen blow rate, activates the chaffer drive unit 57 for making an increase in the inclination of chaffer 52 by two-percent of the range of inclination of chaffer 52, and activates the sieve drive unit 59 for making an increase in the inclination of sieve 53 by two-percent of the range of inclination of sieve 53. In response to a five-percent variation of the measured threshing drum drive torque below the set or standard threshing drum drive torque value, control unit 106 is responsive and activates the concave drive unit 45 to raise the height of concave 42 by two-percent of the set or standard or chosen threshing distance between concave 42 and threshing drum 41 so as to decrease the threshing distance between concave 42 and threshing by two-percent of the set or standard or chosen threshing distance value, activates the blower drive unit 55 for making a decrease in the blow rate of blower 51 by two-percent of the set or standard or chosen blow rate, activates the chaffer drive unit 57 for making a decrease in the inclination of chaffer 52 by two-percent of the range of inclination of chaffer 52, and activates the sieve drive unit 59 for making a decrease in the inclination of sieve 53 by two-percent of the range of inclination of sieve 53. Adjustments/variations to concave 42 settings, blower 51 settings, and chaffer 52 and sieve 53 settings by control unit 106 as herein described are made automatically by control unit 106 actuating concave drive unit 45, blower drive unit 55, chaffer drive unit 52, and sieve drive unit 59 in response to the sensing of variations in the threshing drum drive torque through the interaction between torque sensor 105 and control unit 106 as herein described.

As a matter of example, control unit 106 is programmed with set or standard or chosen combine operation values including a set or standard threshing drum drive torque value of 250 newton meters, a set or standard or chosen height of concave of two inches to define a set or standard or chosen threshing distance value of one inch between concave 42 and threshing drum 41, a set or standard or chosen blow rate of 1000 RPMs of blower 51, a set or standard or chosen inclination of 5 degrees of chaffer 52, and a set or standard or chosen inclination of 5 degrees of sieve 53. In this example, in response to a 12.5 newton meter variation of the measured threshing drum drive torque above the set or standard threshing drum drive torque value, control unit 106 is responsive and activates the concave drive unit 45 to lower the height of concave 42 by two-percent of the set or standard or chosen 1-inch threshing distance between concave 42 and threshing drum 41 or 0.02 inches so as to increase the threshing distance between concave 42 and threshing drum 41 from 1 inch to 1.02 inches, activates the blower drive unit 55 for making an increase in the blow rate of blower 51 by two-percent of the set or standard or chosen blow rate or 20 RPMs so as to increase the blow rate of blower 51 to 1020 RPMs, activates the chaffer drive unit 57 for making an increase in the inclination of chaffer 52 by two-percent of the range of inclination of chaffer 52 or 0.32 degrees so as to increase the inclination of chaffer 52 to 5.32 degrees, and activates the sieve drive unit 59 for making an increase in the inclination of sieve 53 by two-percent of the range of inclination of sieve 53 or 0.32 degrees so as to increase the inclination of sieve 53 to 5.32 degrees. Each 12.5 newton meter increment above the set or standard threshing drum drive torque of 250 newton meters will experience this described variation produced by control unit 106. Furthermore, in response to a 12.5 newton meter variation of the measured threshing drum drive torque below the set or standard threshing drum drive torque value, control unit 106 is responsive and activates the concave drive unit 45 to lower the height of concave 42 by two-percent of the set or standard or chosen 1-inch threshing distance between concave 42 and threshing drum 41 or 0.02 inches so as to decrease the threshing distance between concave 42 and threshing drum 41 from 1 inch to 0.98 inches, activates the blower drive unit 55 for making a decrease in the blow rate of blower 51 by two-percent of the set or standard or chosen blow rate or 20 RPMs so as to decrease the blow rate of blower 51 to 1020 RPMs, activates the chaffer drive unit 57 for making a decrease in the inclination of chaffer 52 by two-percent of the range of inclination of chaffer 52 or 0.32 degrees so as to decrease the inclination of chaffer 52 to 4.68 degrees, and activates the sieve drive unit 59 for making a decrease in the inclination of sieve 53 by two-percent of the range of inclination of sieve 53 or 0.32 degrees so as to decrease the inclination of sieve 53 to 4.68 degrees. Each 12.5 newton meter increment below the set or standard threshing drum drive torque of 250 newton meters will experience this described variation produced by control unit 106.

Control unit 106 may be programmed with any set or standard or chosen values for the threshing drum drive torque value, the concave 42 height value and the threshing distance value between concave 42 of threshing drum 41, the blow rate value of blower 51, the inclination value of chaffer 52, and the inclination value of sieve 53. Although each variation in the threshing drum drive torque that causes actuation of the concave, blower, chaffer, and sieve drive units 45, 55, 57, and 59, respectively, is described as five-percent of the set or standard threshing drum drive torque value, other variation values can be used, preferably within a range of from one-percent to ten-percent of the set or standard threshing drum drive torque value. Furthermore, although for each variation in the measured threshing drum drive torque as measured by torque sensor 105, whether above or below the set or standard threshing drum drive torque value of 250 newton meters, control unit 106 is responsive and activates the concave drive unit 45 to make a two-percent variation in the threshing distance between concave 42 and threshing drum 41, a two-percent variation in the blow rate of blower 51, a two-percent variation in the inclination of chaffer 52, and a two-percent variation in the inclination of sieve 53, all as described, other percent variations can be used and the percent variations can be made to vary from concave 52, blower 51, chaffer 52, and sieve 53.

Adjustments/variations to concave 42 settings, blower 51 settings, chaffer 52 settings, and sieve 53 settings by control unit 106 as herein described are made automatically by control unit 106 actuating concave drive unit 45, blower drive unit 55, chaffer drive unit 52, and sieve drive unit 59 in response to the sensing of variations in the threshing drum drive torque through the interaction between torque sensor 105 and control unit 106 as herein described. These adjustments/variations made by control unit actuating concave, blower, chaffer, and sieve drive units 45, 55, 57, and 59, are preferably made concurrently, meaning at the same time. The operational parameters of control unit 106 can be set by an operator in operator's cab 21 actuating control panel 110 of control system 100. Control panel 110 is a combine optimization control panel and is a touch-screen panel in the present embodiment. A series of touchscreen buttons 120 allow an operator to select the type of crop to be harvested. Control unit 106 (FIG. 2) is programmed with combine operation values for each crop type, which can vary from crop-to-crop. An operator can press the touchscreen button 120 for one of the crop types. In response to making such a selection, control unit 106 is responsive and actuates concave drive unit 45, blower drive unit 55, chaffer drive unit 52, and sieve drive unit 59, which sets them to settings that tend to match the values of the corresponding combine operation values for the selected crop. Once a crop has been selected, the illustrated combine 10 may be operated in the normal manner and control system 100 operates as above to tend to produce, or otherwise tend toward, a favorable influence on grain loss. In the alternative, the threshing drum drive torque, concave 42 height, blower 51 blow rate, chaffer 52 inclination, and sieve 53 inclination can be adjusted and set by an operator in operator's cab 21 via operator controls actuating the threshing drum drive unit 42A (FIG. 1) that drives threshing drum 41, actuating concave drive unit 45 that drives concave 42, actuating blower drive unit 55 that drives blower 51, actuating chaffer drive unit 57 that drives chaffer 52, and actuating sieve drive unit 59 that drives sieve 53. A series of "enter manual" touchscreen buttons 130 allow an operator to then select the type of crop to be harvested. In response to making such a selection, control unit 106 sets and stores combine operation values matching the manual settings made by the operator, and combine 10 may be operated in the normal manner and control system 100 operates as above to tend to produce, or otherwise tend toward, a favorable influence on grain loss. Control panel 110 is furnished as series of "enable" and "disable" touchscreen buttons relating to concave 42, fan or blower 51, chaffer 52, and sieve 53, which may be used to selectively enable and disable concave 42, blower 51, chaffer 52, and/or sieve 53 to and from the influence of control system 100, if so desired.

An exemplary combine optimization control system 100 is described in the illustrated combine 10. Combine 10 ground speed will produce an expected or standard feedrate for a crop to be harvested, and threshing assembly 40 and cleaning assembly 50 are set settings to relate to the expected or standard feedrate for the particular crop so as to tend to produce, or otherwise tend toward, balance between threshing assembly 40 and cleaning assembly 50, which tends to have a favorable influence on grain loss. When in operation, threshing drum 41 assumes a mean or standard or set/chosen threshing drum drive torque. Control system 100 is responsive to variations from this threshing drum drive torque to make adjustments in concave 42 distance or height in relation to threshing drum 41, blower 51 blow rate, chaffer 52 inclination, which inclination is sometimes referred to as the chaffer angle of inclination, and to sieve 53 inclination, which inclination is sometimes referred to as the sieve angle of inclination. In this way, a constant combine 10 ground speed may be maintained, whereby combine 10 operational efficiency is maintained via adjustments to concave 42, blower 51, chaffer 52, and sieve 53 settings through the actuation by control unit 106 of concave drive unit 45, blower drive unit 55, chaffer drive unit 57, and sieve drive unit 59 in response to variations in the threshing drum drive torque from the mean or standard threshing drum drive torque in response to variations in federate caused by the condition of the crop and/or variations in the combine ground speed caused by natural fluctuations in the ground terrain, namely, the upward slope of hills that can cause combine ground speed to be reduced and the downward slope of hills that can cause combine ground speed to be increased. An increase in threshing drum drive torque means an increased crop material throughput from an expected or standard throughput and causes control unit 106 to increase concave 42 distance from threshing drum 41 from its set distance, to increase the blow rate of blower 51, to increase the inclination, i.e. the angle of inclination, of chaffer 52 from its set inclination, and to increase the inclination, i.e. the angle of inclination, of sieve 53, to tend to match the settings of concave 42, blower 51, chaffer 52, and sieve 53 to the increased threshing drum drive torque so as to tend to have, or otherwise tend toward, a favorable influence on grain loss. A decrease in threshing drum drive torque means a decreased crop material throughput from an expected or standard throughput and causes control unit 106 to decrease concave 42 distance from threshing drum 41 from its set distance, to decrease the blow rate of blower 51, to decrease the inclination, i.e. the angle of inclination, of chaffer 52 from its set inclination, and to decrease the inclination, i.e. the angle of inclination, of sieve 53, to match the settings of concave 42, blower 51, chaffer 52, and sieve 53 to the decreased threshing drum drive torque so as to tend to have a favorable influence on grain loss. In the preferred embodiment, control system 100 is responsive to variations in the threshing drum drive torque to make adjustments in concave 42 distance or height in relation to threshing drum 41, blower 51 blow rate, chaffer 52 inclination, which inclination is sometimes referred to as the chaffer angle of inclination, and to sieve 53 inclination, which inclination is sometimes referred to as the sieve angle of inclination, all for tending to produce, or tending toward, balance between the loads across threshing assembly 40 and cleaning assembly 50 for, in turn, tending to favorably influence grain loss. In an alternate embodiment, sieve 53 adjustment may be omitted, whereby control system 100 is responsive to variations in threshing drum drive torque to make adjustments in concave 42 distance or height in relation to threshing drum 41, blower 51 blow rate, and chaffer 52 inclination, all for tending to produce, or tending toward, balance between the loads across threshing assembly 40 and cleaning assembly 50 for, in turn, tending to favorably influence grain loss, according to the principle of the invention.

The invention has been described above with reference to a preferred embodiment. However, those skilled in the art will recognize that changes and modifications may be made to the embodiment without departing from the nature and scope of the invention. Various changes and modifications to the embodiment herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. An agricultural combine, comprising:

a frame;

ground engaging machinery for propelling the frame through a field;

a threshing assembly for threshing a harvested agricultural crop to produce chaff and grain, the threshing assembly includes a threshing drum that operates at a standard threshing drum drive torque, a concave that operates at a set distance from the threshing drum in relation to the standard threshing drum drive torque, and a concave drive unit;

a cleaning assembly for removing the chaff from the grain, the cleaning assembly includes a blower that operates at a set blow rate in relation to the standard threshing drum drive torque, a blower drive unit, a chaffer that operates at a set inclination in relation to the standard threshing drum drive torque, and a chaffer drive unit;

a control system, operatively coupled to the threshing drum, the concave drive unit, the blower drive unit, and the chaffer drive unit, for sensing a variation in the standard threshing drum drive torque and for activating the concave drive unit for making a variation in the set distance of the concave for buffering the variation in the standard threshing drum drive torque, and for activating the blower drive unit and the chaffer drive unit for making variations in the set blow rate of the blower and the set inclination of the chaffer, respectively, for matching the variation in the standard threshing drum drive torque for reducing grain loss.

2. An agricultural combine according to claim 1, wherein the control system comprises a torque sensor for measuring variations in the standard threshing drum drive torque, and a control unit operatively coupled between the torque sensor, and each of the concave drive unit, the blower drive unit, and the chaffer drive unit.

3. An agricultural combine according to claim 2, wherein the variation in the set distance of the concave comprises one of increasing and decreasing the distance of the concave from the set distance of the concave.

4. An agricultural combine according to claim 3, wherein the variation in the set blow rate of the blower comprises one of increasing and decreasing the blow rate of the blower.

5. An agricultural combine according to claim 4, wherein the variation in the set inclination of the chaffer comprises one of increasing and decreasing the inclination of the chaffer relative to the blower.

\* \* \* \* \*